United States Patent [19]

Eilers et al.

[11] Patent Number: 4,584,708

[45] Date of Patent: Apr. 22, 1986

[54] COMMUNICATION SYSTEM, AND TRANSMITTER THEREFOR, INCLUDING SPECIAL ANNOUNCEMENT RECOGNITION

[75] Inventors: Norbert Eilers, Hildesheim; Peter Brägas, Itzum, both of Fed. Rep. of Germany

[73] Assignee: Blaupunkt-Werke GmbH, Hildesheim, Fed. Rep. of Germany

[21] Appl. No.: 690,840

[22] Filed: Jan. 14, 1985

Related U.S. Application Data

[63] Continuation of Ser. No. 319,653, Nov. 9, 1981, abandoned.

[30] Foreign Application Priority Data

May 27, 1981 [DE] Fed. Rep. of Germany ....... 3121087

[51] Int. Cl.4 .......... H04B 1/00

[52] U.S. Cl. .......... 455/45; 332/21; 332/22; 332/40; 332/41; 370/11; 381/4; 455/70; 455/102

[58] Field of Search .......... 455/3, 45, 54, 56, 58, 455/68, 70, 102, 103, 108; 370/11; 332/17, 21, 22, 38, 40, 41; 381/4, 14

[56] References Cited

U.S. PATENT DOCUMENTS

| | | | |
|---|---|---|---|
| 2,008,082 | 7/1935 | Mueller | 455/102 |
| 2,414,431 | 1/1947 | Alford et al. | 455/103 |
| 3,922,607 | 11/1975 | Wysong | 455/45 |
| 4,379,947 | 4/1983 | Warner | 370/11 |

FOREIGN PATENT DOCUMENTS

| | | |
|---|---|---|
| 2051031 | 4/1972 | Fed. Rep. of Germany . |
| 2240941 | 2/1974 | Fed. Rep. of Germany . |
| 2533946 | 2/1977 | Fed. Rep. of Germany . |
| 2651484 | 5/1978 | Fed. Rep. of Germany . |

OTHER PUBLICATIONS

"Verkehrsrundfunk"-P. Brägas, Aug. 1974, Rundfunktechnische Mitteilungen, vol. 18, No. 4, pp. 193-202.

"Codage en Modulation de Phase des E'Metterurs Re ionaux à Modulation d'Amplitude: Application AU Radio-Guidage-J. Lepaisant et al., Oct. 1980, L'Onde Electrique, vol. 60, No. 10, pp. 33-38.

*Primary Examiner*—Marc E. Bookbinder

*Attorney, Agent, or Firm*—Frishauf, Holtz, Goodman & Woodward

[57] ABSTRACT

FM transmission system in which, besides program content, an auxiliary carrier of, for example 57 kHz, is radiated, which auxiliary carrier is modulated by an announcement recognition (AR) signal and by a region or radio-station recognition (RR) signal, the AR and RR signals being low-frequency, AM modulations on the auxiliary carrier. To enhance recognition of an AR signal, e.g. between 142 and 170 Hz, is enhanced, in spite of reception difficulties, for example due to multipath reception and the like, by decreasing the modulation of the 57 kHz subcarrier by the RR signal to 30% or less, while the AR signal is modulating the subcarrier, so that the AR modulation may extend to 60 and even 90% modulation. Multiple AR frequencies can be used, for example to characterize different announcements, e.g. in different languages, or of different characteristics, such as traffic, news, sports, or others, recognition of the AR signal in the receiver permitting switchover from other reproduced programs, e.g. tape, to the demodulator from the receiver tuned to the station emitting the AR signal, to reproduce the announcement, or the like.

44 Claims, 7 Drawing Figures

COMMUNICATION SYSTEM, AND TRANSMITTER THEREFOR, INCLUDING SPECIAL ANNOUNCEMENT RECOGNITION

This application is a continuation of application Ser. No. 319,653, filed Nov. 9, 1981, now abandoned.

Reference to related patent and applications, assigned to the assignee of this application, and incorporated herein by reference:

U.S. Pat. No. 3,949,401, Hegeler et al, Apr. 6, 1976.

U.S. Ser. No. 06/319,654, filed Nov. 9, 1981, now U.S. Pat. No. 4,435,843, Mar. 6, 1984 Bragas and Eilers "FM RECEIVER FOR GENERAL PROGRAMS AND SPECIAL ANNOUNCEMENTS".

U.S. Ser. No. 06/319,655, filed Nov. 9, 1981, now U.S. Pat. No. 4,450,589, May 22, 1984 Bragas and Eilers "FM RECEIVER FOR RECEPTION OF SPECIAL ANNOUNCEMENTS AND GENERAL PROGRAMS".

The present invention relates to a transmission system, and a transmitter therefor, for frequency modulated (FM) radio transmission in which general programs are radiated on the normal, assigned transmitter frequency, and in which special subcarriers are provided to characterize announcements, such as, for example, traffic or other announcements, which are to be radiated in addition to the general programs, and to a radio transmission method.

BACKGROUND

The referenced U.S. Pat. No. 3,949,401 describes an FM transmission system in which special recognition frequencies are used for special announcements which are not to be missed by the user of radio receivers, for example automobile radio receivers. Such announcements may, for example, be traffic announcements or sports announcements, and the like. Transmitters which radiate such special announcements can be recognized by radio receiver equipment by sensing an auxiliary carrier which is radiated in addition to the program modulation. A suitable frequency for the additional carrier, besides the program modulation, is 57 kHz which, in stereo transmitters, is radiated as the third harmonic of the 19 kHz stereo pilot tone, in synchronism therewith. The 57 kHz auxiliary carrier is phase-locked to the 19 kHz pilot tone so that the zero or null crossings are synchronous, and in the same crossing direction. The auxiliary carrier is used additionally for the transmission of auxiliary information, hereinafter referred to as "recognition", which are superimposed in the form of amplitude modulation on the auxiliary carrier. For a detailed discussion, the referenced U.S. Pat. No. 3,949,401, and the literature cited therein, is referred to.

One of the "recognitions" is radiated together with the announcement. The respective recognition indicates that, during radiation over the FM transmitter, an announcement is being broadcast and, therefore, will be termed herein as announcement recognition, AR for short. An announcement recognition signal—AR signal—corresponds to the signals described as the DK signals in the aforementioned U.S. Pat. No. 3,949,401. The AR signal is within a very narrow frequency band at 125 Hz, modulating the auxiliary carrier of 57 kHz with 30% of the amplitude of the auxiliary carrier.

A receiver which is arranged to operate with the system includes a 57 kHz detector and an amplitude demodulator and switching in the audio stage. The 57 kHz detector and the amplitude demodulator control the switching of the audio output. Various switching arrangements are possible: For example, the amplitude of reproduction during the announcement could be raised to call specific attention thereto—for example to a traffic warning announcement; or, if the receiver is muted, a muting circuit is disabled; or, in a combined radio-cassette recorder, the audio section can be switched over from reproduction from the cassette to reproduction of the announcement when the announcement starts, and for switch-back to reproduction from the cassette when the announcement has terminated. Tape transport in the cassette can also be controlled to cause the cassette to stop and start in synchronism with interruption of its audio output.

The auxiliary 57 kHz carrier can provide further recognition signals. One further such recognition signal is used to characterize a specific transmitting radio station, or a geographic region. All transmitters capable of radiating the announcements which are within a specific geographical region, for example, may be assigned the same region recognition, for short RR, and provide RR signals, which correspond to the BK signals of the aforementioned U.S. Pat. No. 3,949,401. The traffic announcements within a region generally relate to the same geographical area. The region recognition signal modulates the amplitude of the auxiliary carrier continuously with 60% of the auxiliary carrier amplitude. The band width of the various region recognition signals, and their position with respect to each other, is so selected that, with a quality of more than 20, adjacent channel separation of more than 15 db is obtained. Within the available frequency band, six RR signal frequencies have been set in one system, and so relatively positioned that the harmonics of any RR signal fall outside of any other RR signal. Suitable frequencies for region identification, that is, RR signals, are, for example 23.75 Hz, 28.27 Hz, 34.93 Hz, 39.58 Hz, 46.67 Hz, 53.98 Hz, 63.61 Hz, 75.80 Hz, 98.69 Hz, and 122.85 Hz.

During an announcement, then, the auxiliary 57 kHz subcarrier is modulated by two recognition signals, namely the AR, announcement recognition, signal, and the RR, region recognition, signal. When no announcement is being given, the auxiliary 57 kHz carrier is modulated only with the RR, the region recognition, signal. Basically, any one transmitter may have a signal representative thereof assigned to it, for radiation on the auxiliary carrier, if the frequency availability of region recognition frequency is sufficient. Thus, the region recognition signal may also be used as a radio station recognition signal, based upon availability of freqeuncies, so that, within any one geographical area, different transmitters may have different RR frequencies assigned thereto.

The 57 kHz auxiliary or subcarrier can be used in signal-seeking or scanning receivers to cause a scanning tuner to stop and tune in the specific station which radiates the 57 kHz subcarrier, while passing all others. Since the 57 kHz frequency is the third harmonic of the 19 kHz stereo pilot tone, non-linearities in the transmitter, or in the receiver, may cause harmonics of the 19 kHz pilot tone to be erroneously recognized as a 57 kHz subcarrier, by generating a 57 kHz signal upon tuning to a transmitter which does not radiate this subcarrier at all. To prevent such ambiguities, and to avoid response to a spurious third harmonic, the detector for the 57 kHz auxiliary carrier may include an auxiliary recognition branch which enables the output from the detector only if a further detector also recognizes the RR (region recognition) signal. Such a system is described, for example, in German Pat. No. 25 33 946.

In one later circuit, the extent or degree of modulation of the auxiliary carrier by the RR signal is determined; if the appropriate degree of modulation of 60% is detected, scanning of the frequency band of a scanning receiver is interrupted and the receiver is locked to that station. This system operates satisfactorily within the wide ranges of reception. Under some severe transmission and reception conditions, however, erroneous switching still can occur due to erroneous evaluation of the signal received and erroneous decoding of the signal which may simulate an AR signal. For example, multipath reception may cause modulation of the 57 kHz auxiliary carrier in such a manner that the AR modulation is simulated, thus triggering erroneous switch-over of the audio stage. This situation may occur, for example, if a vehicle is traveling at a given speed along a divider or picket fence which, by the fortuitous coincidence of spacing of pickets or supports, speed of the passing vehicle, and terrain, or other fortuitous conditions, causes modulation of the 57 kHz carrier at a frequency erroneously simulating the AR frequency.

THE INVENTION

It is an object to improve the signal recognition in a signaling system using subcarriers and announcement recognition (AR) and region or radio-station recognition (RR) signals so that fortuitous, erroneous switching of a receiver, for example due to random uncontrolled modulation of the radiated signal, is effectively prevented.

Briefly, and to insure unambiguous switching, the auxiliary carrier, typically of the 57 kHz frequency, is modulated with one modulation signal, for example the region or radio-station (RR) signal at a lower modulation level, for example at less than 50% of the normal modulation level during predetermined program portion for example during announcement. Preferably, further, the signal is modulated during predetermined program portions, for example during announcements, with another recognition signal, for example the announcement (AR) signal, at a modulation degree in excess of, for example, 40%.

In a preferred form, the auxiliary 57 kHz carrier during the announcement, for example, is modulated with the AR signal by about 60% of its amplitude, and with the RR signal by about 30% of its amplitude, so that the overall modulation of the 57 kHz auxiliary carrier iis about 90%, preferably not essentially in excess thereof.

The system has the advantage that a second characteristic is provided to recognize an announcement, which can be evaluated in a receiver either independently or together with the evaluation or analysis of the frequency band previously used to recognize an announcement.

By lowering the modulation degree of the auxiliary 57 kHz carrier due to the RR signal from the previously utilized modulation degree from 60% to, for example, about 30%, the degree of modulation of the 57 kHz auxiliary carrier by the second recognition signal, that is, the AR signal, can be raised from 30% to about 60%, and thus improve the recognition of the AR frequency.

In accordance with a feature of the invention, it is possible to completely discontinue radiation of the RR signal characterizing a region or radio-station during transmission of certain types of program material, and to modulate the 57 kHz auxiliary carrier only by the AR signal, in which case the AR signal modulation may be raised to 90% modulation. Thus, if a user knows which station, at what frequency, is to be selected to obtain the announcements, the receiver will automatically reproduce the announcements by switch-over to the information content of the radiated signal, regardless of the previously commanded position of the receiver, e.g. muted, tape reproduction, or the like; or the receiver is already tuned to the station by a signal seeking circuit which has responded to the RR modulation prior to radiation of the AR signal.

DRAWINGS

Figure 1:
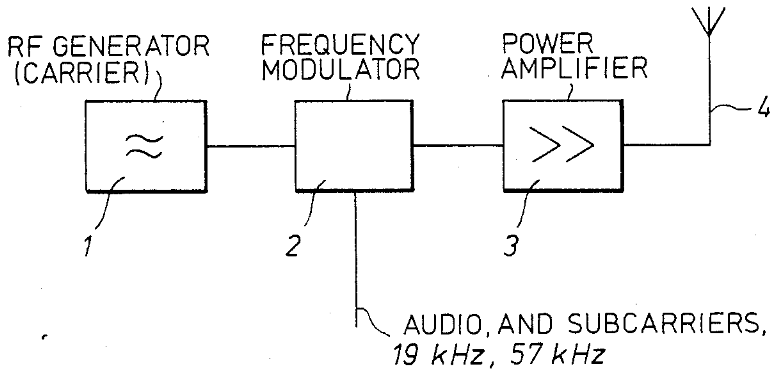
FIG. 1 is a schematic block diagram of an FM transmitter, omitting all features not necessary for an understanding of the present invention.

A radio frequency (RF) generator 1 (FIG. 1) generates the carrier frequency for the transmitter. The carrier frequency is frequency-modulated by a frequency modulator 2 with wide-band audio frequency modulation. Power amplifier 3 amplifies the frequency-modulated carrier for radiation in an antenna 4.

Transmitters in the system of the aforementioned U.S. Pat. No. 3,949,401, and to which the present invention relates, are modulated by not only the audio content and pilot tones, or subcarriers, but, additionally, by the auxiliary frequency which, in the embodiment selected and which has become standard in Europe, is at a frequency of 57 kHz. This auxiliary 57 kHz subcarrier carries further information in the form of amplitude modulation (AM). The subcarrier of 57 kHz is synchronized with the 19 kHz stereo pilot subcarrier, and phase-locked therewith so that zero cross-over occurs in the same direction.

Figure 2:
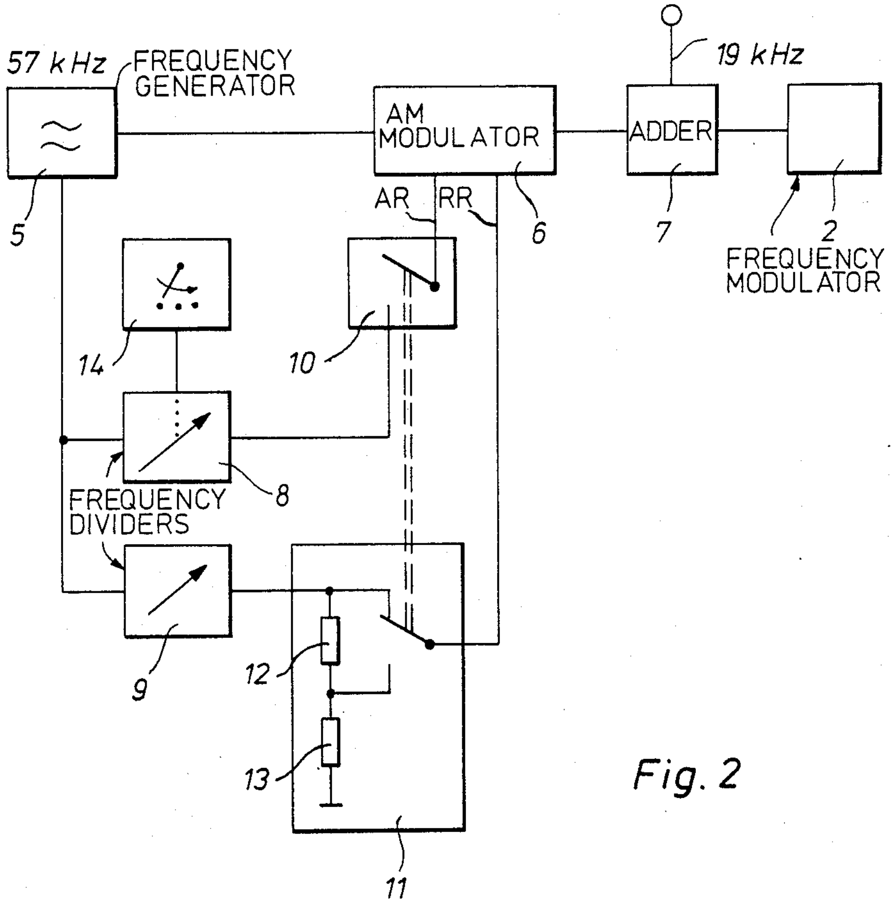
FIG. 2 is a block diagram of a modulator for the 57 kHz auxiliary carrier.

The auxiliary 57 kHz carrier is generated in a 57 kHz generator 5—see FIG. 2—and amplitude-modulated in AM modulator 6 with the characteristics, representative of the respective recgnition frequencies. An adder 7 combines the AM modulated 57 kHz signal with other modulation, for example including the stereo pilot frequency of 19 kHz, for application to the FM modulator 2. The AM modulator 6 has two inputs, one for the announcement recognition, AR, signal, and one for the region or radio-station recognition, RR, signal, that is, for the separate recognition characteristics. The RR signal, as stated, is associated with, and characterizes a transmitter, or a region in which various transmitters operate; the AR signal is associated with, and characterizes that the transmitter will transmit a special program, for example an announcement via its normal audio frequency band and that, therefore, the receiver should be put in a condition to reproduce this special program, e.g. announcement.

In accordance with a preferred embodiment of the invention, both recognition signals are obtained by whole-number division from the auxiliary carrier frequency, so that the recognition frequency will have an extremely narrow band width. The division ratios are so selected that the second recognition frequency, in this case the AR signal frequency, is above a second harmonic of the power network frequency, that is, is above 120 Hz.

Two frequency dividers 8, 9 are connected to receive an input reference from frequency generator 5. Their outputs are connected through switches 10, 11 to the modulator 6. The switches 10, 11 are synchronously switched and can be externally operated or controlled, for example under transmitter station operator control. The switch 10 only has an ON/OFF switch; the switch 11 includes a switchable voltage divider formed of resistors 12, 13, each of which has the same resistance value Ro. The output from the frequency divider 11, thus, in dependence on the position of the switch therein, will be either at full voltage or at half voltage. The output signals of the frequency dividers 8, 9 are so matched to the amplitude of the 57 kHz generator that each one separately modulates the 57 kHz signal applied to the modulator 6 by 60%. In the switching position shown, only the output signal from frequency divider 9 is applied to the associated RR signal input of the modulator 6. Thus, the 57 kHz auxiliary frequency is solely modulated by the RR region or radio-station auxiliary carrier to the extent of 60%. When the switches 10, 11 change over, the output signals of both the frequency dividers 8, 9 are applied to the AM modulator 6. The RR signal now will be applied only with 30% modulation power, whereas the modulation extent of the AR signal is 60%, as previously noted. Both modulation frequencies, thus, together modulate the amplitude of the auxiliary 57 kHz carrier to the extent of 90%, so that, in this respect, they fit standards already established for systems of this type.

The frequency division effected by the frequency divider 9 to characterize the region or radio-station, is different for respective radio-stations or regions; if the number of available frequencies within the RR frequency band is sufficient, it is possible to assign specific transmitters their own RR signals at their own specific RR frequencies. The difference of frequency of the RR signal from region to region, or between stations, and the selectivity of frequency division control, are indicated by the arrow within frequency divider 9.

A selector switch 14 is provided, connected to the frequency divider 8 in order to be able to change the frequency division ratio of the divider 8. This permits associating the response of specific receivers only for specific program contents. For example, the announcements may follow each other, sequentially, in different languages, and the user may wish to listen to the announcements in only one of the languages. The announcement recognition frequency, thus, can be within the frequency range fitting against the lower limiting frequency thereof—slightly above the second harmonic of power network frequency—and, for example, may be up to 170 Hz. The switch 14 illustrates three positions, for example for three separate AR signals, each having assigned thereto the respective AR signal, for example to characterize the particular program, for example by language. It is, of course, equally possible to associate specific announcement recognition frequencies with program content. For example, one AR frequency may be assigned to traffic announcements, another one to general news, and another one to sports reports, and the like. The particular type of program content—which, for purposes of this application, also includes language—can thus be controlled and selected by suitable positioning of the switch 14 to control the frequency division ratio of the frequency divider 8. Selection of the frequency division ratio is shown, schematically, by the arrow in frequency divider 8, connected for control by the switch 14 as shown by the dotted connection.

Figure 3:
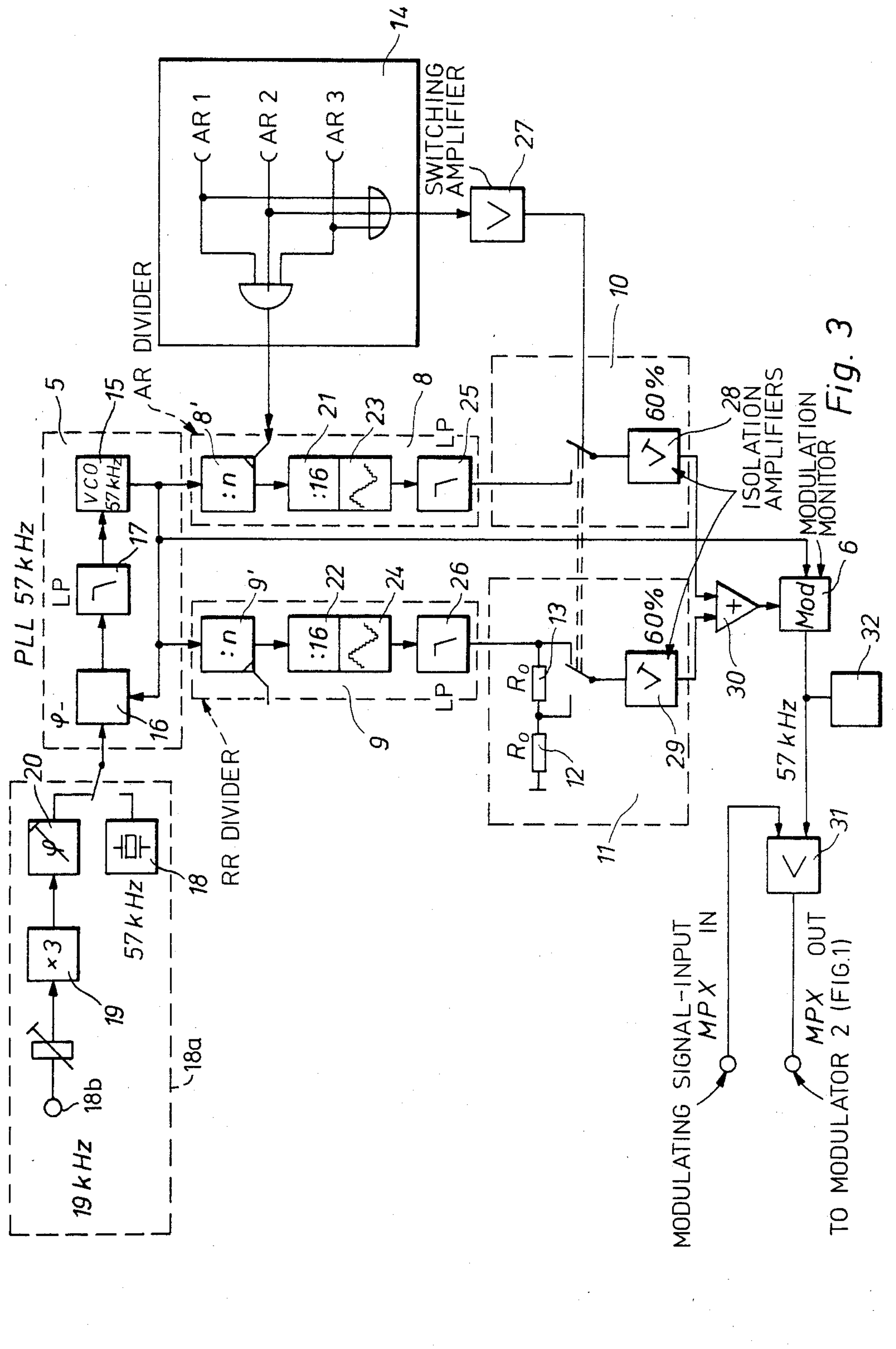
FIG. 3 is a detail diagram of the modulator of FIG. 2.

The 57 kHz generator 5 is constructed as a phase-locked loop (PLL), see FIG. 3, and includes a voltage-controlled oscillator 15, a phase detector 16, and a low-pass filter 17. The PLL 5 is connected to a 57 kHz reference frequency source **18*a*. Reference source 18*a* is, preferably, for monophonic transmission a 57 kHz crystal 18; for stereo transmission, it is an accurately frequency-controlled 19 kHz pilot carrier generator 18*b* which provides, after suitable attenuation, an output to a three-times frequency multiplying circuit 19 to which a phase shift circuit 20 is connected, so that the zero crossing of the fundamental 19 kHz and of the 57 kHz frequencies will be coincident. The output signal of the 57 kHz reference source is detected in the phase detector 16 and compared with the output signal from the voltage controlled oscillator (VCO) 15. A possibly required correction signal is applied to the VCO 15 through the low-pass filter 17** in order to synchronize phasing.

For the AR frequency division stage 8', three division ratios are possible; the RR frequency division stage 9' permits setting to one of ten frequency division ratios. Division ratios of 21, 23 and 25 can be selected for the AR divider 8'; division ratios of 150, 126, 102, 90, 78, 66, 56, 47, 36 and 29 can be selected for the RR divider 9'. Digital divider crcuits are well known, and reference is made, for example, to the "Motorola Semiconductor Handbok", 1974 edition, FIG. 4.64.

Both division stages 8', 9' have a modulo-16 divider 21, 22, respectively, cnnected thereto, to which respective staircase generators 23, 24 are connected, the output signals of which are applied to low-pass filters 25, 26. The staircase generator 23, together with low-pass filter 25, forms a sine wave derived from the digital output frequency of the divider 21, so that the output of the low-pass filter 25, as determined by the respective division ratio assigned to te specific AR frequency selected, will be either 169.7 Hz, 154.9 Hz, or 142.5 Hz. The staircase generator 24, together with low-pass filter 26, provides, in similar manner any one of the following frequencies, as determined by the division ratio of the divider 9': 23.75 Hz, 28.27 Hz, 34.93 Hz, 39.58 Hz, 45.67 Hz, 53.98 Hz, 63.61 Hz, 75.8 Hz 98.96 Hz and 122.85 Hz.

Deriving a sine wave of the respective frequency from the digital output of the frequency dividers 21, 22, itself, is well known, see, for example, U.S. Pat. No. 4,083,008, Eschke, Apr. 4, 1978, assigned to the assignee of the present application, and particularly the circuits shown in FIG. 3 thereof.

The switches 10, 11 (FIGS. 2, 3) are switched over under power derived from a switching amplifier 27 which, in turn, is controlled by the selector switch 14.

The selector switch 14 is operator controlled. Upon selection of a desired announcement recognition frequency, the division ratio is selected and, simultaneously, the switches 10, 11 are switched. The switches 10, 11 include isolaton amplifiers 28, 29, respectively, to prevent loading the output signal of the switching stages 10, 11 by the subsequent circuit. The isolation amplifiers are so adjusted that the auxiliary carrier is modulated by the output signal thereof from either one to the extent of 60%, if the output from the low-pass filter 25, 26, respectively, applied to the respective isolation amplifier 28, 29, is at a predetermined fixed level, for example is full output thereof. The isolation amplifiers have linear amplification.

Switching stage 11, internally, either applies full or half voltage to the isolation amplifier 29, in dependence on switch setting, by cnnectng the output from low-pass filter 26 to the voltage divider formed by resistors 12, 13. Thus, upon switch-over of the switch from the position shown in FIG. 3, the output from the RR signal switch 11 will be half, and thus the degree of modulation of the auxiliary carrier at 57 kHz will be reduced from 60% to 30%. This reduction is synchronous wit connecton of the AR signal which, by itself, modulates the 57 kHz signal by 60%.

The output signals from the isolation amplifiers 28, 29 are combined in adder 30, and the output signal is applied to the control input of modulator 6 which has the 57 kHz auxiliary subcarrier applied thereto. The so modulated 57 kHz subcarrier is connected to a mixing amplifier 31 in which the subcarrier is modulated on the information content, for example audio content, MPX, from the transmitter and is applied from mixer 31 to the modulator 2 of the transmitter (see FIG. 1).

The output signal from the modulator 6 can be monitored by a monitoring or measuring unit 32. The monitoring instrument 32 can be used to control the degree of modulation of the auxiliary carrier applied, respectively, by the isolation amplifiers 28, 29, that is, the RR signals and AR signals, to permit a calibration and possible later readjustment of the amplifiers 28, 29.

Figure 4:
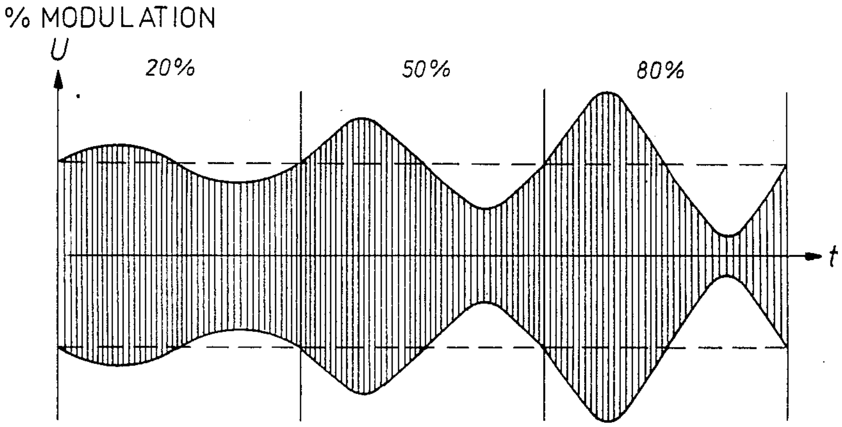
FIG. 4 is a graph illustrating various degrees of modulation of a high-frequency carrier with a low-frequency signal.

Various degrees of modulation of a high-frequency carrier with a low-frequency signal are illustrated in FIG. 4 to illustrate the effect of different degrees of modulation. The representation, of course, is well known.

Other degrees of modulation, of course, can be used; the change in modulation, that is, the relative relationship of the modulation of the AR signal and the RR signal, among each other and upon change of the switches 10, 11, likewise can be varied.

Figure 5:
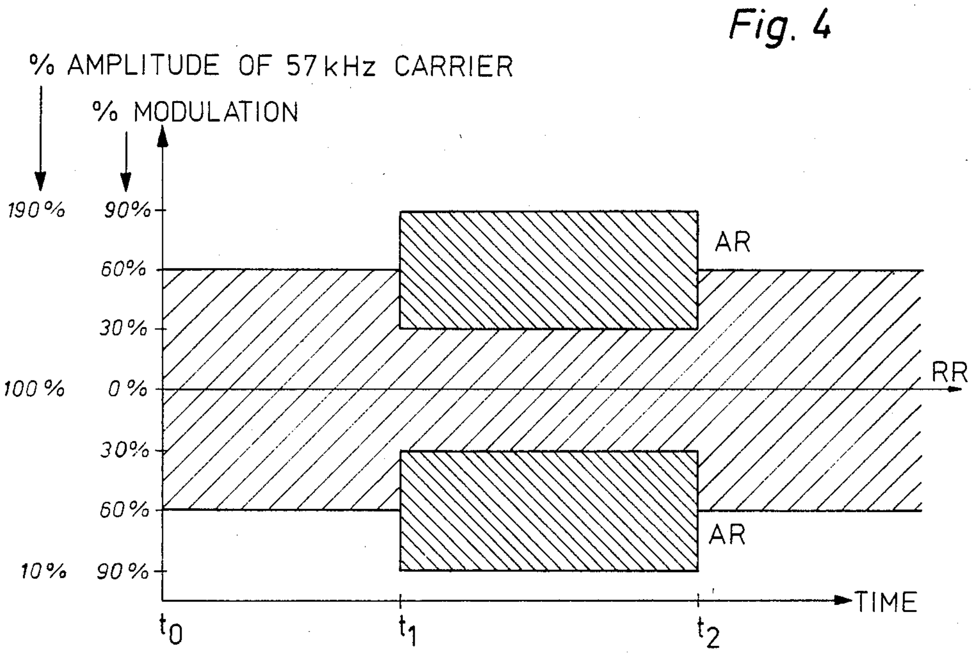
FIG. 5 is a time (abscissa) degree of modulation (ordinate) diagram of the modulation distribution, as a function of time, in accordance with the invention.

Operation, with reference to FIGS. 4 and 5: At any time, for example time $t_0$, that is, before the commencement of a special type of programming which is to be specifically characterized, for example an announcement, the 57 kHz auxiliary carrier is solely modulated by the region or radio-station recognition frequency RR, for example 53.98 Hz, with a modulation degree of 60% amplitude. The amplitude of the auxiliary carrier, thus, varies between 40 and 160% of its unmodulated value. At time $t_1$, an announcement is to be made, or special programming is commended. At this time, the announcement recognition, or AR signal, is rendered active. The synchronous switching of switches 10, 11—FIGS. 2, 3—drops the modulation of the RR signal to 30%, and the variation of the 57 kHz auxiliary signal, at the about 54 kHz frequency, will vary between 70% and 130% of the unmodulated value thereof. Superimposed thereon, however, is the modulation of the AR signal which, in turn, modulates the auxiliary carrier with 60% modulation, so that the amplitude of the auxiliary carrier, as a whole, oscillates between 10% and 190% of the unmodulated value thereof. The program content itself, that is, the information of the announcement, is applied as the modulating signal input, MPX IN (FIG. 3), in the form of monophonic or stereo audio presentation. The announcement or special program is terminated at time $t_2$. At this time, both switches 10, 11 change over to the position shown in full lines in FIGS. 2 and 3, and the previously established modulation conditions of the auxiliary subcarrier of 57 kHz, will continue to persist, see time period $t_0$ to $t_1$.

Various changes and modifications may be made within the scope of the invention; for example, modulation of the auxiliary 57 kHz carrier by the region of radio-station recognition signal RR can be completely disconnected or suppressed, and the auxiliary 57 kHz carrier can be modulated solely by the AR signal, which then permits a higher degree of modulation for the AR signal, for example up to about 90%. The region of radio-station recognition signal, of course, is needed only to recognize the frequency of the station which carries the information, either by automatic recognition in a signal searching or panoramic-type receiver, or by visual identification that the receiver is tuned to a station which emits the RR signal on the subcarrier, for example by observation of a monitoring lamp, or the like, as explained in detail in the aforementioned U.S. Pat. No. 3,949,401.

As can be seen from the foregoing, a receiver equipped to respond to the transmissions as described can employ any of several features of the 57 kHz transmission to control the receiver and associated equipment. For example, the receiver can decode the level of modulation of the 57 kHz subcarrier to obtain from a receiver signal an output representative of at least two of the following:

(a) presence of modulation of the 57 kHz subcarrier by the RR amplitude modulation frequency of its first, higher level;

(b) the change in level or degree of amplitude modulation of the 57 kHz subcarrier by the RR amplitude modulation frequency only;

(c) level of overall modulation of the 57 kHz subcarrier during the respective time periods, e.g. $t_0$ to $t_1$, and $t_1$ to $t_2$; and (d) degree of change of level of modulation of the 57 kHz subcarrier by the RR amplitude modulation frequency only.

Recognition of the AR signal, and/or recognition of the drop in the RR modulation degree which is decoded in the receiver, then permits various switching functions in the receiver to be controlled, in accordance with the structure of the receiver. For example, if the receiver includes or is connected to a tape recorder, such as a cassette or cartridge recorder, recognition of the AR signal and/or recognition of the drop in the RR modulation degree permits interruption of the program from the tape, if desired coupled with stopping of the tape transport, so that the special programming, for example an announcement, will be reproduced by the audio reproduction portion of the receiver; or if the receiver operates at low volume, the volume level can be changed, for example raised, so that the announcement will not be missed and can be clearly understood over background or road noise; or if the receiver is tuned to a different station or; for example, to receive Citizan Band (CB) signals, the CB mode can be interrupted. In a receiver with dual tuners, for example one for stations which radiate the RR signals, and other stations which do not, switch-over of the audio station to that one which also radiates the RR signal can be effected so that the announcement, as characterized and identified during transmission by radiation of the AR signal, can be reproduced in the loudspeaker system associated with the receiver.

Figure 6:
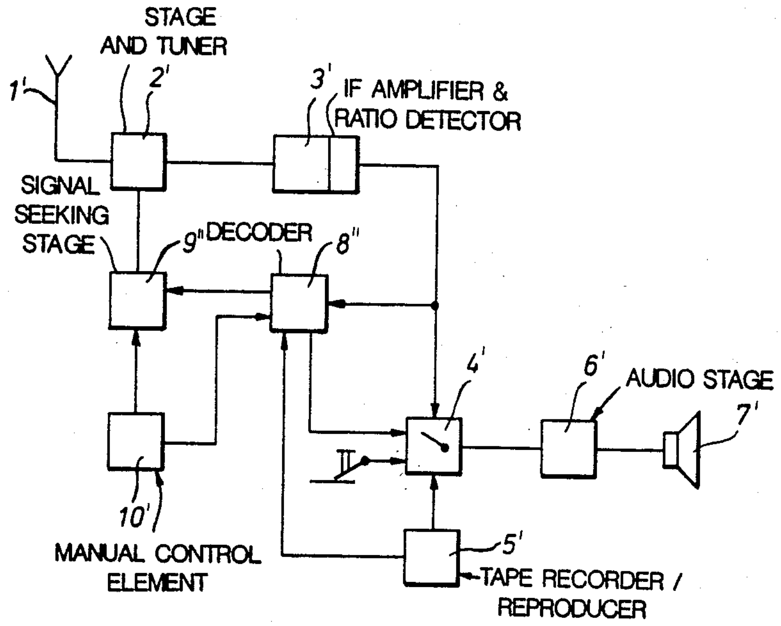
FIG. 6 is a schematic block diagram of an FM receiver, omitting all components not necessary for an understanding of the present invention, and adapted to receive and decode the signals radiated by the transmitter of FIG. 1.
Figure 7:
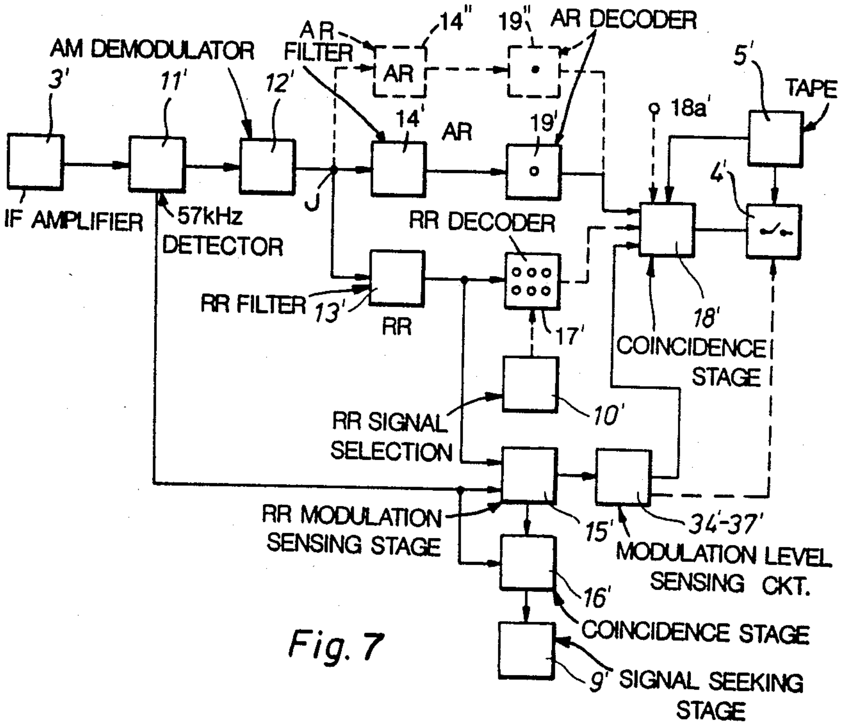
FIG. 7 is a block circuit diagram of an announcement decoder incorporated in the receiver of FIG. 6.

The referenced applications Ser. No. 06/319,654, now U.S. Pat. No. 4,435,843, and Ser. No. 06/319,655, now U.S. Pat. No; 4,450,589, both filed of even data herewith and by the inventors hereof, describe circuit details of receivers suitable to receive the signals radiated in accordance with the method and by the apparatus described herein. FIG. 6 is identical to FIG. 1 of the referenced U.S. Pat. No. 4,540,589, except that the reference numerals have been given prime notations; and FIG. 7 is identical to FIG. 2 of the referenced U.S. Pat. No. 4,450,589, with reference numerals having prime or double prime notations assigned, respectively.

An antenna 1'—FIG. 6—applies received input signals to a radio frequency (RF) stage 2', which includes a tuner to tune the receiver to a desired station. An intermediate frequency (IF) stage 3' is connected to a ratio detector from which the program content information which is radiated can be derived. The modulation includes an amplitude-modulated 57 kHz auxiliary carrier. A transfer switch 4' is provided to connect, selectively, signals to an audio amplifier 6' and from then on to a loudspeaker 7', which are derived either from an external audio source, shown as a tape recorder 5', or from the ratio detector 3'.

The switch 4' can be operated either manually or automatically. Switch-over can be controlled automatically under command of an announcement decoder 8' which is also connected to receive the output from the IF amplifier and ratio detector 3', forming the FM IF amplification and demodulation stage. The decoder 8'' is connected to a signal searching or automatic tuning system, similarly to the tuning system of a panaromic or frequency spectrum receiver, shown as signal seeking state 9'', which controls the tuning adjustment of tuner 2'. It is placed in operation by the control element 10. The control element 10' is connected to the decoder 8'' to select predetermined signals or transmitters to be sought or tuned under automatic tuning control.

The output signal from the IF amplifier-ratio detector stage 3' is applied to a 57 kHz detector, for example a filter circuit or the like. This circuit is included in the decoder 8'', FIG. 7. The 57 kHz detector 11' analyzes the received signal for the presence of the 57 kHz auxiliary subcarrier. The auxiliary subcarrier is then applied to a demodulator 12', in which the amplitude modulation is separated from the auxiliary carrier. The modulation frequencies there include the frequencies of the RR region or radio-station recognition signal and, if a special program is to be transmitted, for example, an announcement, the AR or announcement recognition frequency as well.

The AR frequency component and the RR frequency component are separated in two parallel filters 13', 14'. Filter 13' covers a frequency band solely characteristic of frequencies within the range of the RR signals. The AR filter 14' covers solely the AR frequency or, if a plurality of frequencies are involved, a band width of the AR signals. An AR decoder 19' is connected to the AR filter 14'. The AR decoder senses presence or absence of the AR signal of AR signals, and provides a corresponding logic output to a coincidence state 18'.

The RR filter 13' is connected to an RR decoder 17'. The RR decoder 17' can be controlled by an RR signal selector 10' to select one of a plurality of region or radiostation recognition frequencies, if such is desired; since this is not a necessary feature of the invention, the connection between the RR signal selector and the RR decoder 17' is shown in broken line. RR decoder 17' provides an output signal representative of the presence or absence of the RR signal, the frequency or characteristic of which has been selected by the RR signal selector 10' or, if set and wired into the receiver, the presence of the previously wired-in RR frequency. Presence of such a signal is indicated by a connection line to coincidence stage 18'.

If coincidence stage 18' has a signal applied to at all of its inputs, a switching pulse is applied to the switch 4' which switches-over the audio portion of the signal received by antenna 1' (FIG. 6) of the receiver to the audio stage 6', 7'.

The switch 4' in the low-frequency portion of the receiver thus always responds when a signal is received which includes the AR signal, that is, when the transmitter provides its recognition signal that an announcement or special program is to be radiated, regardless of the setting of the audio reproduction portion of the receiver. For example, if the receiver is switched to reproduce audio output from the tape recorder/reproducer 5', reproduction from the external audio signal source formed by the tape recorder/reproducer 5' is interrupted, but only if the receiver senses a received signal from a transmitter and only if the receiver is tuned to a transmitter which is associated with the RR signal which has been selected by signal selector 10', or which is inherent in the apparatus, and which, also, radiates a special program, for example an announcement, as characterized by additional radiation of the AR signal.

Filter 13' additionally is connected to an RR modulation sensing stage 15' which senses the degree of modulation of the auxiliary 57 kHz subcarrier by the RR signal. As long as the sensed modulation degree exceeds a predetermined reference level of modulation, coincidence stage 16' will receive a control signal from the sensing stage 15'. The coincidence stage 16' also receives a signal directly of the 57 kHz subcarrier, directly from the 57 kHz detector 11'. The output of the coincidence stage 16' is applied to a signal seeking stage 9'' in the input section of the receiver as a criterion to determine if the receiver is tuned to a station which radiates the 57 kHz subcarrier, for example to provide a stop signal for scanning the tuning band by an automatic tuning circuit, similar to a signal seeking or panoramic receiver, or, if a signal has been sensed which does not include the 57 kHz auxiliary subcarrier, to continue scanning until such a transmitter is tuned-in.

The decoder 8'', so far described, is known, and is used in various types of traffic information radio receivers.

In accordance with a feature of the present invention, the region or radio-station modulation RR sensing stage 15 is modified to provide additionally to the output for the signal seeking stage 9, a control signal controlling the operation of the transfer switch 4, in accordance with a logic determination based on the change in degree of modulation by the RR signal of the auxiliary carrier to a significant extent, for example a change in modulation of 50% of prior modulation.

This, then, permits a substantially increased level, or degree of modulation of the AR modulation signal if it is intended to indicate that an announcement will be given.

For best ambiguity rejection, the respective levels of modulation of the RR signal and the AR signal should be detected, see the referenced U.S. Pat. No. 4,450,589; the coincidence stage, however, is not absolutely necessary. If, in the transmission system, radiation of the RR signal is discontinued, so that, during an announcement, only the AR signal is radiated, the modulation of the AR signal may then be raised significantly, e.g. to 90% modulation. Thus, the AR decoders 19′, 19″ can provide an output signal to the switch 4′ to switch over automatically from an external audio source, such as tape recorder 5′, to the output from the radio receiver IF amplifier and ratio detector stage.

FIG. 7 illustrates a parallel-connected AR filter 14″, which has a filtering frequency different fromm filter 14′, and associated with an AR frequency characterizing a program content different from that characterized by the AR frequency to which filter 14′ is connected. Decoder 19″ is responsive to the output from filter 14″, and thus provides a coincidence output to the coincidence stage 18′. OR-gates, buffers, and the like, and isolating circuitry and circuit components between the respective circuits 14′, 14′, 19′, 19′ and 18′ have been omitted for clarity; their use is well known in circuit technology.

In some systems, the region or radio-station recognition (RR) signal may drop to a level below 30% modulation, or even to zero modulation, when the AR signal is being radiated. The connection from the RR decoder 17′ to the coincidence stage 18′ may then not be needed; or, alternatively, the connection does not require coincidence with the remaining inputs to the coincidence gate 18′, for example merely being connected thereto when present, so as to characterize the response of the receiver, but not required for coincidence recognition. For this reason, the connection from decoder 17′ to the coincidence stage 18′ is shown in broken line. If no coincidence is required, then, of course, the coincidence stage 18′ may be omitted entirely.

An additional input to coincidence gate 18 to further enhance the selectivity and error rejection thereof is schematically shown by connecting line and terminal 18*a*′. Since this is not a required or necessary feature, the connection is shown in broken lines.

Basically, therefore, the receiver provides for change in the switching stage of the switch 4 as a function of a significant change in the modulation of the 57 kHz subcarrier by the RR signal or by presence of the AR signal which is filtered by filters 14′, 14″ and can be present at a substantial degree of modulation. The level of modulation is easily detected. A modulation level sensing circuit is described in detail in the referenced application Ser. No. 06/319,655, now U.S. Pat. No. 4,450,589, by the inventors hereof.

We claim:

1. In an FM radio transmitter operating at a predetermined main carrier frequency for radiating a signal including (a) program information and (b) an auxiliary carrier, the transmitter having:

means for generating a carrier frequency;

means for generating an auxiliary carrier;

means for radiating the modulated carrier;

first modulating recognition signal generator means for developing a first recognition signal having a first, predetermined, fixed region or radio-station recognition frequency (RR) characterizing at least one of a particular transmitter or the region within which the transmitter is located;

second modulating recognition signal generator means for developing a second recognition signal having a second, predetermined, fixed announcement recognition frequency (AR), characterizing a particular program content, differing from the region or radio-station recognition frequency (RR);

means for amplitude modulating the auxiliary carrier selectively by said first and second signals;

frequency modulation means for frequency modulating the carrier with the program information and the amplitude-modulated auxiliary carrier;

first means controlling the degree of modulation of the auxiliary carrier by said first modulating signal to exceed a predetermined modulation level;

second means controlling the degree of modulation of said auxiliary carrier by said second modulating signal;

the total modulation of said auxiliary carrier by said first and second modulating signals not exceeding about 90%; and means for reducing the degree of modulation by said first modulating signal during the time when the second modulating signal modulates the auxiliary carrier with the announcement recognition frequency (AR).

2. The transmitter according to claim 1, wherein the means for reducing the modulation by said first modulating signal during the time when the second modulating signal modulates the auxiliary carrier comprises means for reducing that modulation to less than 50% modulation of the auxiliary carrier by said region or radio-station recognition frequency (RR).

3. The transmitter according to claim 1, wherein the means for reducing the modulation by said first modulating signal during the time when the second modulating signal modulates the auxiliary carrier comprises means for reducing that modulation to about 50% of the modulation effected by said first modulating signal prior to reduction of modulation.

4. The transmitter according to claim 1, wherein said second modulation control means controlling the degree of modulation by the second modulating signal comprises means for providing modulation by the announcement recognition (AR) frequency to greater than 40% degree of modulation.

5. The transmitter according to claim 4, wherein the first modulating control means controlling the first modulating means comprises means for controlling said first modulating signal to effect about 30% modulation when the second modulating signal is controlled by the second control means to provide said second modulation, and the second control means comprises means for controlling the degree of its modulation to about 60% modulation, whereby the total modulation of said auxiliary carrier will be about 90% modulation.

6. The transmitter according to claim 1, further including a frequency generator generating a signal of a frequency corresponding to the frequency of said auxiliary carrier;

wherein said first modulating signal means includes a first frequency divider connected to said frequency generator, and generating at least one frequency forming the region or radio-station recognition frequency (RR) as a whole-number division of said auxiliary carrier;

and wherein the second modulating signal means includes a second frequency divider connected to the auxiliary frequency generator and generating at least one frequency forming the announcement recognition (AR) frequency as a whole-number division of the frequency of the auxiliary carrier.

7. The transmitter according to claim 6, wherein the frequency dividers comprise divider stages having selectable frequency division ratios, and respective modulo-16 dividers connected to the controllable divider stages;

a staircase generator connected to the respective modulo-16 divider, and a low-pass filter receiving the output from the staircase generator and providing, respectively, said recognition frequencies (RR, AR).

8. The transmitter according to claim 6, wherein the second frequency divider has a division ratio to provide said announcement recognition frequency (AR) at a frequency above the second harmonic of local power network frequency.

9. The transmitter according to claim 6, wherein the frequency division ratio of said second frequency divider is so set that the announcement recognition frequency (AR) is adjacent the lower limiting frequency of the program information radiated by the transmitter.

10. The transmitter according to claim 6, wherein several frequency division ratios of the frequency dividers of the first and second modulation signal means are each selectively adjustable to provide one of several frequencies, and said several frequencies are relatively adjusted such that the higher harmonic frequencies of the region or radio-station recognition frequency (RR) fall between the frequencies selectable for the announcement recognition frequency (AR).

11. The transmitter according to claim 6, wherein the frequency division ratio of the second frequency divider is set to provide an announcement recognition frequency (AR) of approximately 142 Hz.

12. The transmitter according to claim 6, wherein the frequency division ratio of the second frequency divider is set to provide an announcement recognition frequency of (AR) of approximately 170 Hz.

13. The transmitter according to claim 6, further including an isolation amplifier located at the output of each of the first and second frequency dividers;

an adder receiving the output signals from said isolation amplifiers;

a modulator connected to modulate the auxiliary carrier, the output from the adder being connected to said modulator to impress on the auxiliary carrier the modulation, as amplified by said isolation amplifiers, and as added in the adder;

said isolation amplifiers providing, to said adder, essentially equal output when equal input is applied thereto, and effecting, individually, a predetermined degree of modulation of said auxiliary carrier;

wherein said means for reducing the modulation by said first modulating signal comprises a voltage divider connected to the output of the first modulating signal means;

and switching means for switching the outputs from said frequency dividers, the input of the isolation amplifier at the output of said first frequency divider being switchable between said frequency divider and, selectively, a tap point on said voltage divider, the input of the isolation amplifier at the output of said second frequency divider being switchable between an off connection and said second voltage divider to provide, synchronously, (a) modulation of the auxiliary carrier at a predetermined level by the region or radio-station recognition frequency as controlled by the first isolation amplifier, or (b) modulation of said auxiliary carrier by the region or radio-station recognition frequency from the first isolation amplifier at a reduced level and at the same time modulation of said auxiliary carrier by the announcement recognition from the second isolation amplifier at a second predetermined level.

14. The transmitter according to claim 13, wherein the voltage divider effecting a reduction of modulation by the first isolation amplifier comprises two resistance elements of essentially equal resistance values.

15. The transmitter according to claim 1, wherein the means reducing the modulation effected by said first modulation signal means reduces said modulation to a level of from 0% to 50% of the modulation prior to reduction of the degree of modulation of the auxiliary carrier.

16. In a method of broadcasting radio signals with improved ambiguity rejection of information contained in, or represented by, radiated radio frequency energy, including the steps of (a) modulating a main carrier by program information signals;

(b) providing an auxiliary subcarrier and modulating the main carrier by the subcarrier; and selectively, (c-1) amplitude modulating said auxiliary subcarrier with a first, predetermined, fixed region or radio-station recognition frequency modulation signal characterizing a particular geographical region within which a transmitter is located, or a transmitter, and (c-2) selectively amplitude modulating said auxiliary subcarrier with a second, predetermined, fixed announcement recognition frequency modulation signal differing in frequency from said first radios tation recognition frequency modulation signal and characterizing a particular program content of said program information, the improvement comprising the steps of:

controlling the degree of modulation by the first amplitude modulation signal on the subcarrier to provide a first level of modulation of the subcarrier above 50% modulation in the absence of the second modulation signal during a first time period ($t_0$ to $t_1$);

reducing the degree of modulation by said first modulation signal to a reduced level upon modulation of the subcarrier by the second modulation signal during a second time period ($t_1$ to $t_2$) to provide for simultaneous reduction of the modulation degree of said subcarrier by said first modulation signal during additional modulation of the subcarrier by the second modulation signal.

17. The method according to claim 16, wherein the steps of modulating the subcarrier by the second modulation signal and lowering the degree of modulation by said first modulation signal together comprise a step of raising the overall degree of modulation of the subcarrier above said degree of modulation by said first modulation signal.

18. The method according to claim 17, wherein said step of controlling the degree of modulation by the first modulation signal comprises setting a modulation degree of substantially 60% for said first amplitude modulation signal, the step of reducing comprises lowering the degree of modulation to less than approximately 30% by the first amplitude modulation signal, and the step of raising includes providing an overall raised modulation degree of substantially 90%.

19. The method of claim 16, further including the steps of receiving the radiated energy;

decoding the radiated energy with respect to modulation of the subcarrier by the second modulation signal; and obtaining an output representative of presence of said second modulation signal when the degree of modulation of the subcarrier by said second signal is at least 50%.

20. Method according to claim 19, wherein the step of obtaining said output includes obtaining the output when the degree of modulation of the subcarrier by said second modulation signal is 60%.

21. The method of claim 16, further including the steps of receiving the radiated energy;

decoding the radiated energy with respect to modulation of the subcarrier by the second modulation signal; and obtaining an output representative of modulation of the subcarrier during said second time period ($t_1$ to $t_2$) of at least 60%.

22. In a radio broadcast system adapted for interruption of regular broadcasts with occasional broadcasts of special program content:

means for generating a main carrier frequency;

means for modulating the main carrier frequency with signals representing main or information content of regular broadcasts and for additionally frequency modulating the main carrier frequency by an auxiliary special broadcast carrier;

means for producing the auxiliary special broadcast carrier;

first modulation signal producing means for producing a first recognition signal at a first, predetermined, fixed frequency;

second modulation signal producing means for producing a second recognition signal at a second, predetermined, fixed frequency;

means for selectively modulating the auxiliary carrier with at least the first recognition signal; and means for at least substantially reducing the level of modulation of the auxiliary carrier by the first recognition signal when the second recognition signal is applied to the modulating means.

23. The radio broadcast system according to claim 22, wherein the overall level of modulation of the auxiliary carrier by the substantially reduced first recognition signal and the modulation level of the second recognition signal exceeds the modulation level of the modulation of the auxiliary carrier by the modulation level of the first recognition signal prior to reduction of its level of modulation.

24. The broadcast system of claim 22, wherein the means for reducing the modulation level of the first recognition signal includes:

second recognition signal switching means for connecting the means for producing the second recognition signal to the means for selectively modulating the auxiliary carrier at the time of a special program broadcast; and first recognition signal switching means for applying a higher level of the first recognition signal from the means for producing that signal to the means for selectively modulating when no second recognition signal is applied to the means for selectively modulating and for applying a lower level of the first recognition signal to the means for selectively modulating when the second recognition signal switching means applies the second recognition signal to the means for selectively modulating.

25. The radio broadcast system according to claim 24, wherein the first recognition signal switching means comprises a voltage divider circuit connected to the first modulation signal producing means and developing a divided first modulation signal output therefrom, means interconnecting the first and second recognition signal switching means to effect switching by the first recognition signal switching means from full first modulation signal to divided first modulation signal when the second recognition signal switching means connects the second recognition signal to the means for selectively modulating the auxiliary carrier.

26. The radio broadcast system according to claim 22, wherein the means for at least substantially reducing eliminates the modulation of the auxiliary carrier by the first recognition signal when the second recognition signal is applied to the means for selectively modulating.

27. The radio broadcast system according to claim 22, wherein the second modulation signal producing means includes means for choosing one of plural frequencies for said second recognition signal.

28. The radio broadcast system according to claim 27, wherein the second modulation signal producing means comprises a frequency divider for dividing the frequency of the auxiliary special broadcast carrier, and the means for choosing one of plural frequencies includes control signal means for applying a control signal to the divider to establish the number by which the subcarrier is divided to produce the second recognition signal.

29. The ratio broadcast system according to claim 28, further comprising a switching amplifier connected to the means for applying a control signal, said switching amplifier having an output operatively connected to actuate the means for at least substantially reducing the modulation level of the auxiliary carrier by the first recognition signal.

30. The radio broadcast system of claim 22, wherein the first modulation signal producing means comprises a controllable frequency divider for dividing the frequency of the auxiliary special broadcast carrier to select among one of several first recognition signal frequencies.

31. The radio broadcast system of claim 22, further comprising means for receiving programs broadcast in the form of modulation signals on said main carrier frequency;

means for detecting said auxiliary special broadcast carrier; and means for detecting modulation of said auxiliary special broadcast carrier by the second recognition signal at said second predetermined fixed frequency when the level of percent of modulation of the auxiliary special broadcast carrer by said second recognition signal is above a predetermined level.

32. System according to claim 31, wherein said modulation detection means is responsive to the detection of the level of percent modulation of said second recognition signal of at least 50%.

33. System according to claim 31, wherein said modulation detection means is responsive to the detection of the level of percent modulation of said second recognition signal of at least 60%.

34. A method of radio broadcasting including:

producing a regular broadcast carrier for broadcasting over a region of reception with an assigned frequency;

modulating said carrier with regular program content;

producing an auxiliary special carrier and modulating the regular broadcast carrier with said auxiliary special carrier;

producing a first recognition signal at a first, predetermined, fixed frequency;

producing a second recognition signal at a second, predetermined, fixed frequency;

modulating the auxiliary carrier with the first recognition signal at a first modulation level to indicate the occasional availability of a special broadcast in the region of reception of broadcasting;

selectively modulating the auxiliary carrier with the second recognition signal to indicate the presence of a special program content of broadcast at that time on the assigned frequency; and substantially reducing the level of modulation of the auxiliary carrier by the first recognition signal at the time of modulation of the auxiliary carrier by the second recognition signal.

35. The method of ratio broadcasting according to claim 34, including simultaneously modulating the auxiliary carrier by the first, reduced recognition signal and by the second recognition signal, during broadcast of a special program, and at an overall level of modulation higher than the modulation of the auxiliary carrier by the full level of the first recognition signal prior to reduction of degree of modulation thereby.

36. The method of radio broadcasting according to claim 34, wherein:

the step of modulating the auxiliary carrier with the first recognition signal at a first level comprises amplitude modulating the auxiliary carrier at a level of modulation greater than 50% of the unmodulated amplitude thereof;

the step of modulating the auxiliary carrier with the second recognition signal comprises amplitude modulating the auxiliary carrier at a level of modulation greater than 40% of the unmodulated amplitude thereof; and the step of substantially reducing the level of modulation of the auxiliary carrier by the first recognition signal comprises diminishing the level of modulation of that carrier to less than 50% of the unmodulated amplitude thereof.

37. The method of radio broadcasting according to claim 34, wherein the step of substantially reducing the level of modulation of the auxiliary carrier by the first recognition signal comprises voltage dividing the first recognition signal and simultaneously switching the second recognition signal into modulating relation with the auxiliary carrier.

38. The method of radio broadcasting according to claim 34, wherein at least one of the steps of producing a first and second recognition signals includes dividing the frequency of the auxiliary carrier.

39. The method of radio broadcasting including:

producing a regular broadcast carrier with an assigned frequency and modulated with regular program content;

producing an auxiliary special broadcast carrier;

modulating the regular broadcast carrier with the auxiliary special broadcast carrier;

producing a first recognition signal at a first, predetermined frequency;

producing a second recognition signal at a second, predetermined frequency different from the first frequency; and during broadcasts of special program contents, amplitude modulating the auxiliary carrier by the first and second recognition signals at levels of modulation below 50% and above 40%, respectively, of the unmodulated amplitude of the auxiliary carrier to provide recognition that at the time of occurrence of said levels of modulation below 50% and above 40%, respectively, said special program content is being broadcast;

and, in the absence of broadcast of special program content, amplitude modulating the auxiliary carrier by the first recognition signal only, at a level of modulation which is above 50% of the unmodulated amplitude of the auxiliary carrier to provide recognition that the regular broadcast carrier may, from time to time, broadcast the special program content.

40. In a radio broadcast system adapted for interruption of regular broadcasts with occasional broadcasts of special program content:

means for generating a main carrier frequency;

means for modulating the main carrier frequency with signals representing main or information content of regular broadcasts and for additionally frequency-modulating the main carrier frequency by a modulated auxiliary special broadcast carrier;

means for producing an unmodulated auxiliary special broadcast carrier;

first modulating signal producing means for producing a first recognition signal at a first, predetermined, fixed frequency;

second modulation signal producing means for producing a second recognition signal at a second predetermined fixed frequency;

means for selectively modulating the auxiliary carrier with the first recognition signal to provide a first level of modulation of the subcarrier above 50% modulation in the absence of the second modulation signal during a first time period ($t_0$ to $t_1$);

means for at least substantially reducing the level of modulation of the auxiliary carrier by the first recognition signal to a reduced level during a second time period ($t_1$ to $t_2$), and applying the second recognition signal to said modulating means to provide for reduction of the degree of modulation of said subcarrier by said first (RR) modulation signal during additional modulation of the subcarrier by the second (AR) modulation signal.

41. The radio broadcast system of claim 40, further comprising means for receiving programs broadcast in the form of modulation signals on said main carrier frequency;

means for detecting said auxiliary special broadcast carrier; and means for detecting modulation of said auxiliary special broadcast carrier by the second recognition signal at said second predetermined fixed frequency and when the level of percent of modulation of the auxiliary special broadcast carrier by said second recognition signal is above a predetermined level.

42. System according to claim 41, wherein said modulation detection means is responsive to the detection of the level of percent modulation of said second recognition signal of at least 50%.

43. System according to claim 41, wherein said modulation detection means is responsive to the detection of the level of percent modulation of said second recognition signal of at least 60%.

44. The system of claim 40, wherein the selective modulating means are connected for modulating the auxiliary carrier during said second time period ($t_1$ to $t_2$) with said first recognition signal to a degree of modulation in the order of about 30% and modulating the auxiliary carrier during said second time period by the second recognition signal with a degree of modulation of about 60%;

said system further comprising means for receiving both the modulated auxiliary carrier and regular broadcast information programs in the form of modulation signals on said main carrier frequency;

means responsive to said modulated main carrier to provide said modulated auxiliary carrier while preventing passage of regular information programs; and means for demodulating said auxiliary carrier and separating the first modulating signal of said first predetermined frequency and the second modulating signal of said second predetermined frequency from each other, said separating means providing an output signal only when the degree of modulation of the second modulation signal of the auxiliary carrier is at least 50%.

* * * * *